W. O. GIBSON.
Cultivator.

No. 59,003. Patented Oct 23, 1866.

Witnesses

Inventor.
W. O. Gibson
Per Munn & Co.
Attorney.

UNITED STATES PATENT OFFICE.

WILLIAM O. GIBSON, OF CHARLESTON, SOUTH CAROLINA.

IMPROVEMENT IN CULTIVATOR-PLOWS.

Specification forming part of Letters Patent No. 59,003, dated October 23, 1866.

*To all whom it may concern:*

Be it known that I, WILLIAM O. GIBSON, of the city and county of Charleston, and State of South Carolina, have invented a new and Improved Cultivator-Plow; and I do hereby declare that the following is a full, clear, and exact description thereof, which will enable others skilled in the art to make and use the same, reference being had to the accompanying drawings, forming part of this specification, in which—

Figure 1:
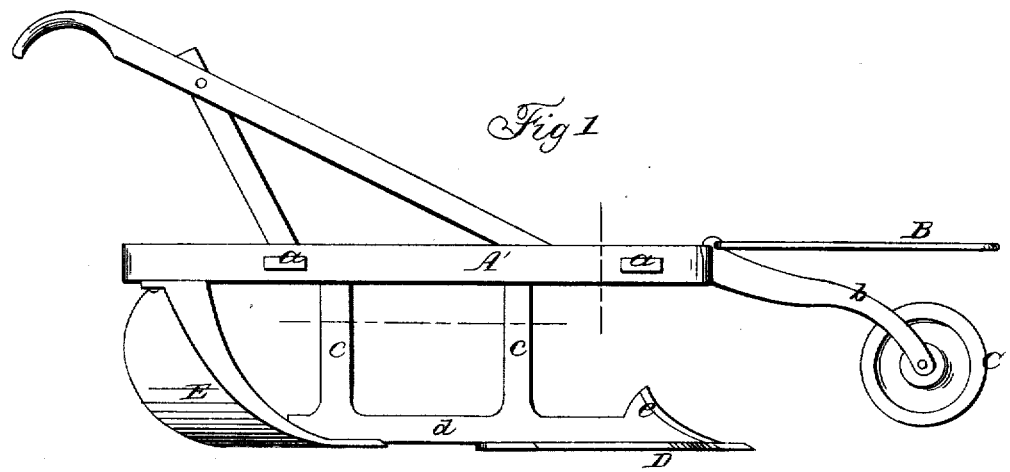
Figure 2:
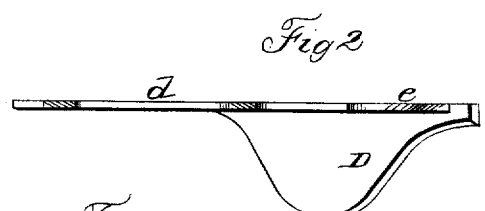
Figure 3:
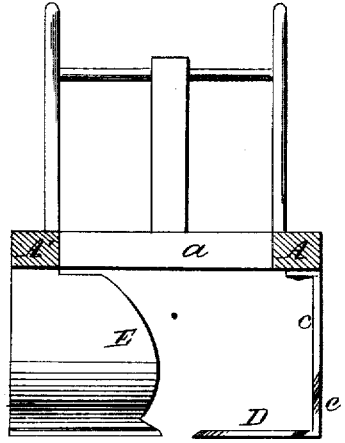

Figure 1 is a side view of my invention; Fig. 2, a horizontal section of one side of the same taken in the line $x\ x$, Fig. 1; Fig. 3, a transverse vertical section of the same, taken in the line $y\ y$, Fig. 1.

Similar letters of reference indicate like parts.

This invention relates to a new and improved cultivator-plow designed for weeding and for loosening the soil around growing plants.

A A' represent two parallel beams connected at a suitable distance apart by cross-bars $a\ a$, and having a bail-shaped rod, B, connected at their front ends, to which the draft is attached.

C is a gage-wheel fitted between the front ends of bars $b$, attached to the front end of the beams A A'.

To the left-hand beam A the vertical standards $c\ c$ are secured, said standards having a horizontal bar, $d$, at their lower ends, said bar $d$ having a colter-projection, $e$, at its front end, with a horizontal weeding blade or knife, D, projecting from its lower edge toward the right-hand beam A'. The standards $c\ c$, bar $d$, colter $e$, and blade or knife D may all be cast, forged, or struck up out of the same piece of metal, if desired.

To the rear part of the other beam, A', there is attached a plow, E, the mold-board of which is at the left-hand side, so as to throw the dirt or soil to the left, or toward the beam A.

The implement is drawn along so that the colter-projection $e$ will work close to the plants, and the horizontal blade or knife D cuts off all weeds below the surface of the earth, and the plow E throws the earth upon the surface thus acted upon and toward the plants. The depth of the penetration of the plow and the blade or knife D is regulated by the gage-wheel C.

The implement is extremely simple, may be manufactured at a small cost, and operates very efficiently, effectually cleaning the earth of weeds around plants grown in hills or drills, and loosening the earth, so that it will be permeable to air and moisture.

Having thus described my invention, I claim as new and desire to secure by Letters Patent—

The two parallel beams A A', connected by two cross-bars, $a\ a$, and provided with the gage-wheel C, in combination with the bar $d$, provided with the colter-projection $e$ and horizontal blade or knife D, and connected to the beam A by the standards $c\ c$, and the plow E, attached to the beam A', all being arranged substantially as and for the purpose set forth.

The above specification of my invention signed by me this 3d day of May, 1866.

W. O. GIBSON.

Witnesses:
   WM. F. MCNAMARA,
   ALEX. F. ROBERTS.